Feb. 27, 1923.
F. A. SCHNUPP.
SEAT SUPPORT.
FILED JUNE 1, 1922.
1,446,588.
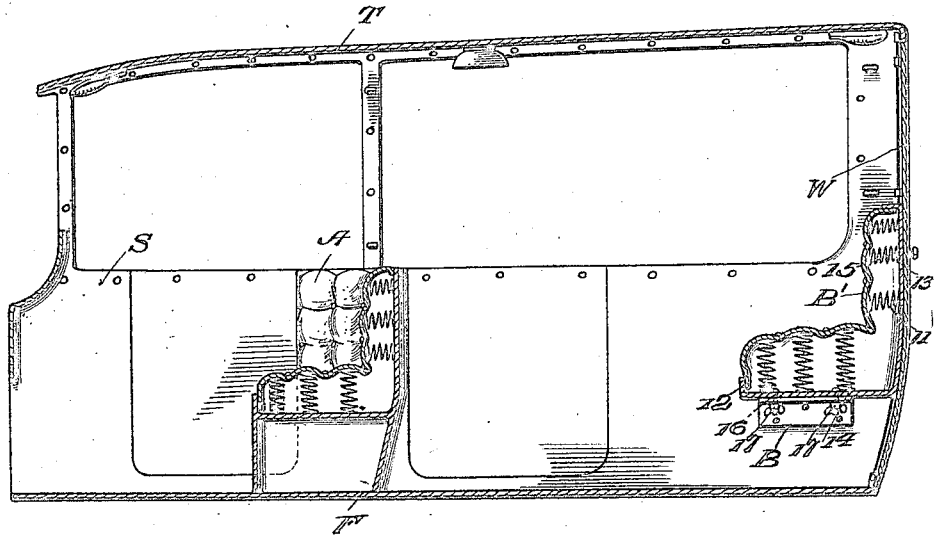
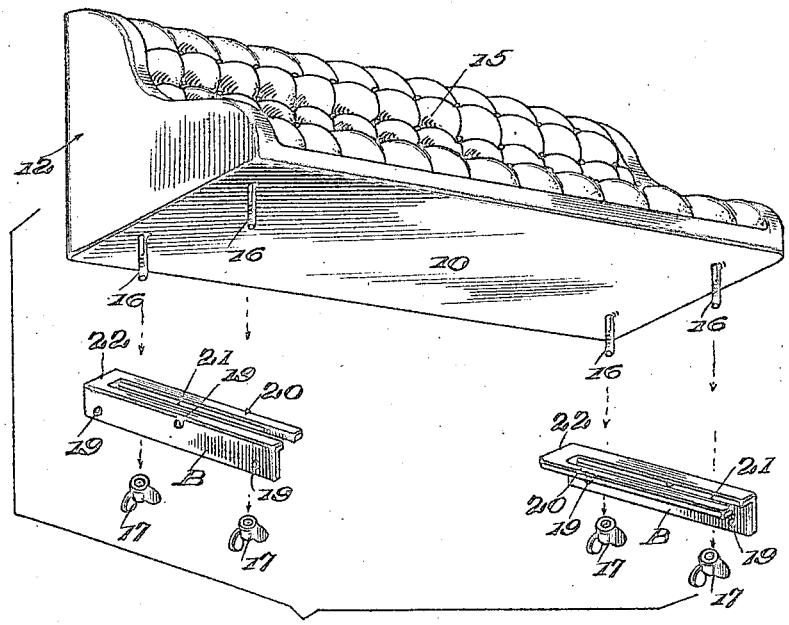

Patented Feb. 27, 1923.

1,446,588

UNITED STATES PATENT OFFICE.

FREDERIC ANDES SCHNUPP, OF MECHANICSBURG, PENNSYLVANIA.

SEAT SUPPORT.

Original application filed May 31, 1921, Serial No. 473,673. Divided and this application filed June 1, 1922. Serial No. 565,028.

*To all whom it may concern:*

Be it known that I, FREDERIC A. SCHNUPP, a citizen of the United States, and a resident of the city of Mechanicsburg, in the county of Cumberland and State of Pennsylvania, have invented certain new and useful Improvements in Seat Supports, of which the following is a full, clear, and exact description.

This invention relates to a seat support for a motor vehicle body.

The present invention is shown and disclosed in my pending application, Serial No. 473,673, filed May 31, 1921 and the present application is a division thereof.

The purpose of the invention is to provide a simple and efficient means for removably supporting a seat in the body of a motor vehicle in such a manner that the seat may be easily positioned or removed in an expeditious manner for converting the automobile body into a van or truck.

Other objects, and objects relating to details of construction, combination and arrangement of parts, will hereinafter appear.

The invention is illustrated by way of example in accompanying drawings, in which:

Figure 1 is a vertical longitudinal sectional view of a motor vehicle body and showing the present invention applied, and Figure 2 is a group view illustrating a seat and supports therefor of the present invention.

In Figure 1 of the drawings the body shown is of the so-called limousine type employed on any type of running gear and briefly consists in the floor, generally indicated by the reference character F, the side walls S, the rear wall W, and the top T which is properly supported as shown and the front and rear seats A and B¹ respectively. In the present instance the rear seat B¹ is removably supported by means corresponding to the present invention.

The rear seat B¹ may consist in a seat boxing comprising the bottom 10, back 11 and sides 12 and within which there is provided the usual springs for the back and seats, as at 13 and 14, respectively, said springs being covered by suitable upholstering, generally indicated at 15. The seat boxing may be constructed of wood or other suitable material and should have extending downwardly from each end thereof a pair of threaded studs 16, each stud carrying a butterfly nut 17.

For removably supporting the seat there is provided a pair of brackets B, each bracket consisting in an L-shaped member having its portion 18 provided with a plurality of openings 19 through which screws or bolts may be extended for securing the same to the side walls of the motor vehicle body. The brackets are placed in transverse alignment relative to the motor vehicle body and adjacent the rear end thereof, as illustrated in Figure 1. The horizontal portion 20 of each bracket is provided with a longitudinally extending slot 21 which is closed at its one end, as at 22. The slots are adapted to slidingly receive the studs 16 carried by the seat B¹. The seat may be positioned in an obvious manner; that is, by placing the same upon the brackets B and sliding the seat rearwardly so that the stud 16 of each end thereof will be disposed between the slots 21 of the brackets. The butterfly nuts 17 should be tightened and thus the seat will be held against movement in either direction. The closure 22 of each slot 21, of course limits the rear movement of the seat.

I claim:

In combination, a vehicle body, a pair of L-shaped inverted and elongated bracket members secured to the side walls of the body, one upon each inner side wall thereof and in transverse alignment with each other and each bracket having its horizontal portion provided with a longitudinally extending slot, said slot being open at one end and terminating at its other end in close relation to the end of the horizontal portion of said bracket, a seat having a plurality of studs extending from the bottom thereof adjacent each end and the studs at each end of the seat being adapted to slide within the slot of the associated bracket, and adjustable means carried by the studs whereby the seat may be clamped in position upon said bracket and said means being also adapted to be manipulated for releasing the seat and permit the same to be slid longitudinally of the brackets and removed therefrom.

FREDERIC ANDES SCHNUPP.